United States Patent
Kang et al.

(10) Patent No.: US 9,652,393 B1
(45) Date of Patent: May 16, 2017

(54) MANAGING SHARED MEMORY IN DATABASE SERVER

(71) Applicant: TmaxData Co., Ltd., Seongnam-si (KR)

(72) Inventors: Ingyu Kang, Unju-myeon (KR); Dongyun Yang, Seongnam-si (KR)

(73) Assignee: TMAXDATA CO., LTD., Seongnam (KR)

( * ) Notice: Subject to any disclaimer, the term of this patent is extended or adjusted under 35 U.S.C. 154(b) by 0 days.

(21) Appl. No.: 15/097,290

(22) Filed: Apr. 13, 2016

(30) Foreign Application Priority Data

Feb. 24, 2016 (KR) .................. 10-2016-0022087

(51) Int. Cl.
| | |
|---|---|
| *G06F 12/08* | (2016.01) |
| *G06F 12/084* | (2016.01) |
| *G06F 12/0868* | (2016.01) |
| *G06F 12/0873* | (2016.01) |
| *G06F 17/30* | (2006.01) |

(Continued)

(52) U.S. Cl.
CPC ........ *G06F 12/084* (2013.01); *G06F 12/0868* (2013.01); *G06F 12/0873* (2013.01); *G06F 12/127* (2013.01); *G06F 17/30318* (2013.01); *G06F 9/5016* (2013.01)

(58) Field of Classification Search
None
See application file for complete search history.

(56) References Cited

U.S. PATENT DOCUMENTS 5,799,210 A * 8/1998 Cohen ................ G06F 7/22
 707/999.007
6,324,623 B1 11/2001 Carey
(Continued)

FOREIGN PATENT DOCUMENTS

| JP | 2005-339236 | 8/2005 |
| JP | 2003-263364 | 9/2013 |
| KR | 10-2006-0058546 | 5/2006 |

OTHER PUBLICATIONS

United States Office Action, mailed Nov. 29, 2016, U.S. Appl. No. 15/087,487 (abandonment of application requested).

(Continued)

*Primary Examiner* — Kaushikkumar Patel
(74) *Attorney, Agent, or Firm* — VLP Law Group LLP; Richard G. A. Bone

(57) ABSTRACT

Provided is a method for managing a shared memory in a database server. The database server includes a shared memory manager which divides a shared memory into a plurality of memory chunks to manage the memory chunks and allocates at least one memory chunk to a cache memory manager based on a request of the cache memory manager; a cache memory manager which requests at least one of the plurality of memory chunks to the shared memory manager, wherein the database server includes a plurality of cache memory managers and the database server uses the memory chunk which is allocated to the cache memory manager as a cache memory having a predetermined purpose, and the predetermined purposes of the plurality of cache memory managers are different from each other; and a main processor which performs a database operation using the cache memory.

14 Claims, 4 Drawing Sheets

(51) Int. Cl.
 *G06F 12/127*   (2016.01)
 *G06F 9/50*   (2006.01)

(56) References Cited

U.S. PATENT DOCUMENTS

| | | | |
|---|---|---|---|
| 7,111,005 B1 | 9/2006 | Wessman | |
| 9,189,421 B2* | 11/2015 | Testardi | G06F 11/1453 |
| 2003/0065688 A1* | 4/2003 | Dageville | G06F 17/30306 |
| 2003/0196042 A1 | 10/2003 | Hopeman | |
| 2007/0229521 A1* | 10/2007 | Li | G06T 1/60 |
| | | | 345/543 |
| 2008/0104152 A1* | 5/2008 | Stephens | G06F 12/0253 |
| 2013/0262752 A1* | 10/2013 | Talagala | G06F 12/02 |
| | | | 711/103 |
| 2014/0047183 A1* | 2/2014 | Chawla | G06F 12/084 |
| | | | 711/119 |
| 2015/0032986 A1* | 1/2015 | Moore | G06F 9/00 |
| | | | 711/171 |
| 2015/0363113 A1* | 12/2015 | Rahman | G06F 3/0653 |
| | | | 707/718 |

OTHER PUBLICATIONS

Korean Office Action, mailed Sep. 29, 2016, KR Application No. 10-2016-0022087; Filed Feb. 24, 2016.

* cited by examiner

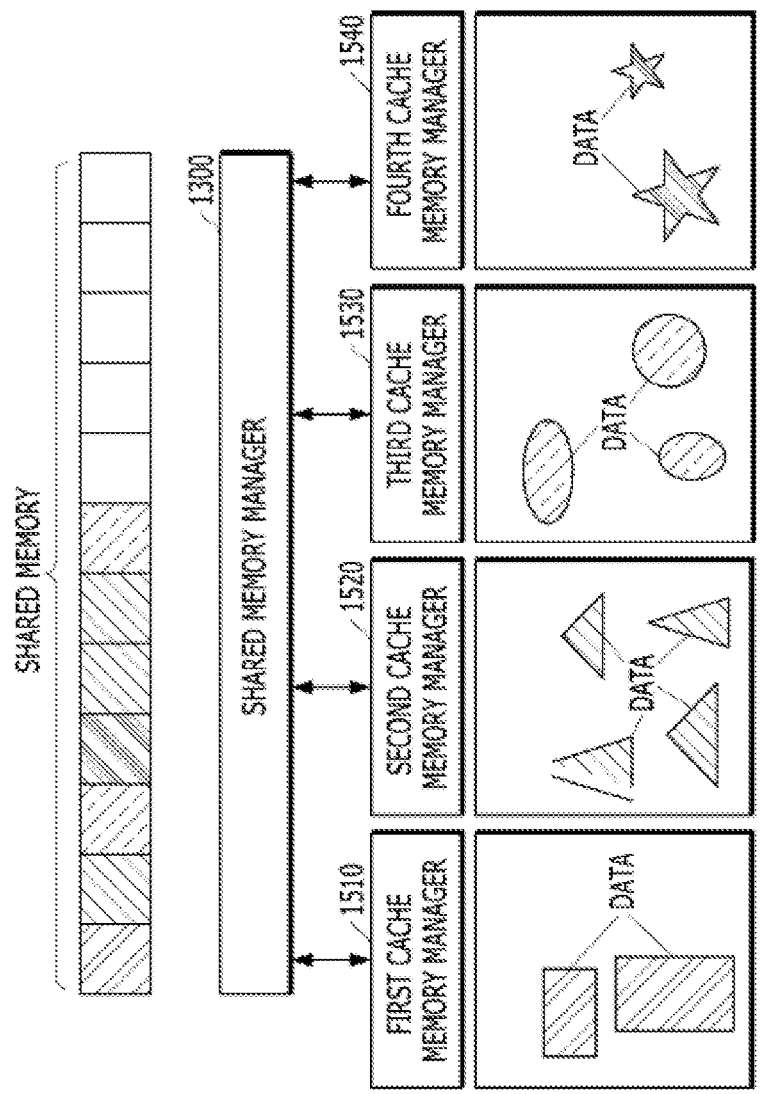

MANAGING SHARED MEMORY IN DATABASE SERVER

CROSS-REFERENCE TO RELATED APPLICATIONS

This application claims priority to and the benefit of Korean Patent Application No. 10-2016-0022087 filed in the Korean Intellectual Property Office on Feb. 24, 2016, the entire contents of which are incorporated herein by reference.

TECHNICAL FIELD

The present disclosure relates to a memory managing method in a database server, and more particularly, to a method for efficiently managing a shared memory.

BACKGROUND ART

Recently, a technique regarding a large size database management system, such as a large amount of structured or unstructured data set which is so large to be collected, stored, managed, and analyzed using a database management tool of the related art, and big data processing which extracts a value from the data and analyzes a result thereof, has been developed.

When a database server performs a database operation, the operation is performed in a memory to shorten an I/O time. For example, when the database server changes data stored in a permanent storage medium, the database server loads data from the permanent storage medium, stores a loaded data in a cache memory, changes an object stored in the cache memory, and then reflects the changed data to the permanent storage medium.

In this case, since the data which is stored in the cache memory is later used for a database operation, the data may be stored without being deleted.

The database server may use a shared memory as a cache memory. The shared memory refers to a memory which may be used by a plurality of processors and the database server uses the shared memory as a cache memory, thereby improving data management efficiency.

Therefore, in order to use the shared memory as a cache memory, a technique which efficiently manages the shared memory needs to be studied.

SUMMARY OF THE INVENTION

The present disclosure has been made in an effort to efficiently manage a shared memory in a database server.

Exemplary embodiments of the present disclosure which embody the above-described object will be suggested.

A first aspect of the present disclosure provides a database server including: a shared memory manager which divides a shared memory into a plurality of memory chunks to manage the memory chunks and allocates at least one memory chunk to a cache memory manager based on a request of the cache memory manager; a cache memory manager which requests at least one of the plurality of memory chunks to the shared memory manager, wherein the database server includes a plurality of cache memory managers and the database server uses the memory chunk which is allocated to the cache memory manager as a cache memory having a predetermined purpose, and the predetermined purposes of the plurality of cache memory managers are different from each other; and a main processor which performs a database operation using the cache memory.

A second aspect of the present disclosure provides a database management program which is stored in a computer-readable medium and includes commands which allow a computer to perform the following operations, the operations including: an operation of controlling a shared memory manager which divides a shared memory into a plurality of memory chunks to manage the memory chunks and allocates at least one memory chunk to a cache memory manager based on a request of the cache memory manager; an operation of controlling a cache memory manager which requests at least one of the plurality of memory chunks to the shared memory manager in order to secure a cache memory required to perform a database operation by a main processor, wherein the database server includes a plurality of cache memory managers and the database server uses the memory chunk which is allocated to the cache memory manager as a cache memory having a predetermined purpose, and the predetermined purposes of the plurality of cache memory managers are different from each other; and an operation which controls a main processor which performs a database operation using the cache memory.

BRIEF DESCRIPTION OF THE DRAWINGS

Various aspects will be described with reference to the drawings in which like reference numerals collectively designate like elements. In the following exemplary embodiments, a number of specific details will be suggested to aid understanding of one or more aspects. However, it will be apparent that the aspect(s) can be implemented without having the specific details. In other examples, known structures and devices are illustrated as a block diagram to simplify the one or more aspects.

FIG. 4 is a view illustrating a method for allocating a shared memory according to an exemplary embodiment of the present disclosure.

DETAILED DESCRIPTION

Figure 1:
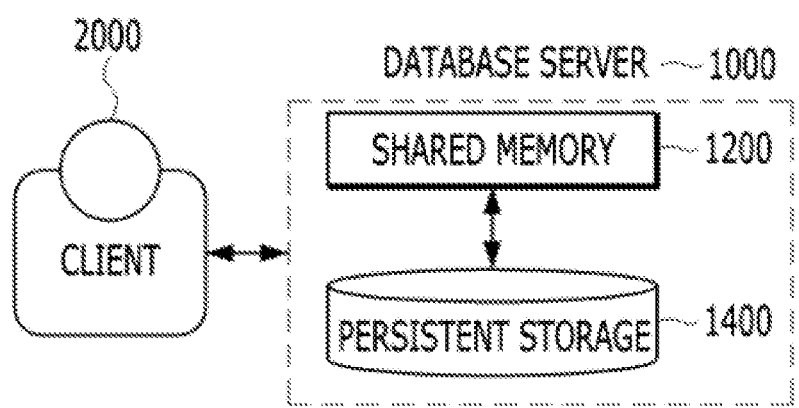
FIG. 1 illustrates a database system 1200 according to an exemplary embodiment of the present disclosure.

Various exemplary embodiments will be described with reference to the drawings and like reference numerals denote like elements throughout the drawings. In the specification, various descriptions are suggested to provide understanding of the present disclosure. However, it is clear that the exemplary embodiments may be implemented without having the specific description. In other examples, known structures and devices are provided as a block diagram to simplify the exemplary embodiments.

Terminologies such as "component", "module", or "system" used in the specification indicate a computer-related entity, hardware, firmware, software, a combination of software and hardware, or execution of software. For example, a component may be a processing step which is executed in a processor, a processor, an object, an execution thread, a program and/or a computer, but is not limited thereto. For example, both an application which is executed in a computing device and a computing device may be a component. One or more components may be found in a processor and/or an executing thread, one component may be localized in one computer or distributed between two or more computers. Such components may be executed from various computer readable media having various data structures stored therein. The components may communicate with each other through local and/or remote processing in accordance with a signal (for example, data through a network such as the Internet via data and/or a signal from one component which interacts with another component in a local system or a distributed system) having one or more data packets.

In this specification, the database refers to a system which stores related data to be processed by a computer. The database may store data and answer an inquiry of a user and data stored in the database may be changed. The database may store new data and delete and change the existing data.

In this specification, transaction refers to a continuous processing unit of a series of jobs, such as exchanging of information or updating of database. This may be defined as a basic unit of a job for completing a job which is requested in a state where integrity of the database is secured.

In this specification, a size of a memory indicates a logical capacity of the memory. For example, a size of the memory may refer to a logical capacity such as 100 megabytes or 1 gigabyte, but is not limited thereto.

Description of the suggested exemplary embodiment is provided to allow those skilled in the art to use or embody the present disclosure. Various modifications of the exemplary embodiments may be apparent to those skilled in the art and general principles defined herein may be applied to other exemplary embodiments without departing from the scope of the present disclosure. Therefore, the present disclosure is not limited to the exemplary embodiments suggested herein, but is interpreted in the broadest range which is consistent with principles suggested herein and new features.

Hereinafter, exemplary embodiments of the present disclosure will be described in detail with reference to the accompanying drawings.

FIG. 1 illustrates a database system 1200 according to an exemplary embodiment of the present disclosure.

A database server 1000 may include an arbitrary type of computer system or computer device such as a microprocessor, a main frame computer, a digital signal processor, a portable device, and a device controller.

A client 2000 may refer to nodes in a database system having a mechanism which communicates through a network. For example, a client 2000 may include a PC, a laptop computer, a workstation, a terminal and/or an arbitrary electronic device having a network connectivity. Further, the client 2000 may include an arbitrary server which is implemented by at least one of an agent, an application programming interface (API), and a plug-in.

The database server 1000 may include a shared memory 1200 and a permanent storage medium 1400.

The shared memory 1200 is a cache memory and is provided to the main processor 1600. For example, when the database server 1000 performs a transaction, the database server 1000 loads data from the permanent storage medium 1400 to store the loaded data in at least a part of the shared memory 1200.

The shared memory 1200 may be divided into a plurality of chunks to be managed. In this case, the shared memory 1200 may be logically or physically divided.

The shared memory 1200 may refer to a volatile storage device which is a main storage device directly accessed by the processor and instantly erases stored information when the power is turned off, such as a random access memory (RAM) including a dynamic random access memory (DRAM) and a static random access memory (SRAM), but is not limited thereto. The memory may be operated by a processor.

A persistent storage 1400 refers to a non-volatile storage which persistently stores arbitrary data. For example, the persistent storage 1400 may include not only a disk, an optical disk, and a magneto-optical storage device, but also a flash memory and/or a battery back-up memory based storage device. The persistent storage 1400 may communicate with the processor and the memory of the database server 1000 through various communication units. In an additional exemplary embodiment, the persistent storage 1400 may be located outside the database server 1000 to communicate with the database server 1000.

A client 2000 and the database server 1000 may communicate with each other through a network. A network according to an exemplary embodiment of the present disclosure uses various wired communication systems such as a public switched telephone network (PSTN), an x-digital subscriber line (xDSL), a rate adaptive DSL (RADSL), a multi rate DSL (MDSL), a very high speed DSL (VDSL), a universal asymmetric DSL (UADSL), a high bit rate DSL (HDSL), and a local area network (LAN).

A network suggested in this specification uses various wireless communication systems such as code division multiple access (CDMA), time division multiple access (TDMA), frequency division multiple access (FDMA), orthogonal frequency division multiple access (OFDMA), single carrier-FDMA (SC-FDMA), and other systems. The techniques described in this specification may be used not only in the above-mentioned networks, but also in other networks.

Figure 2:
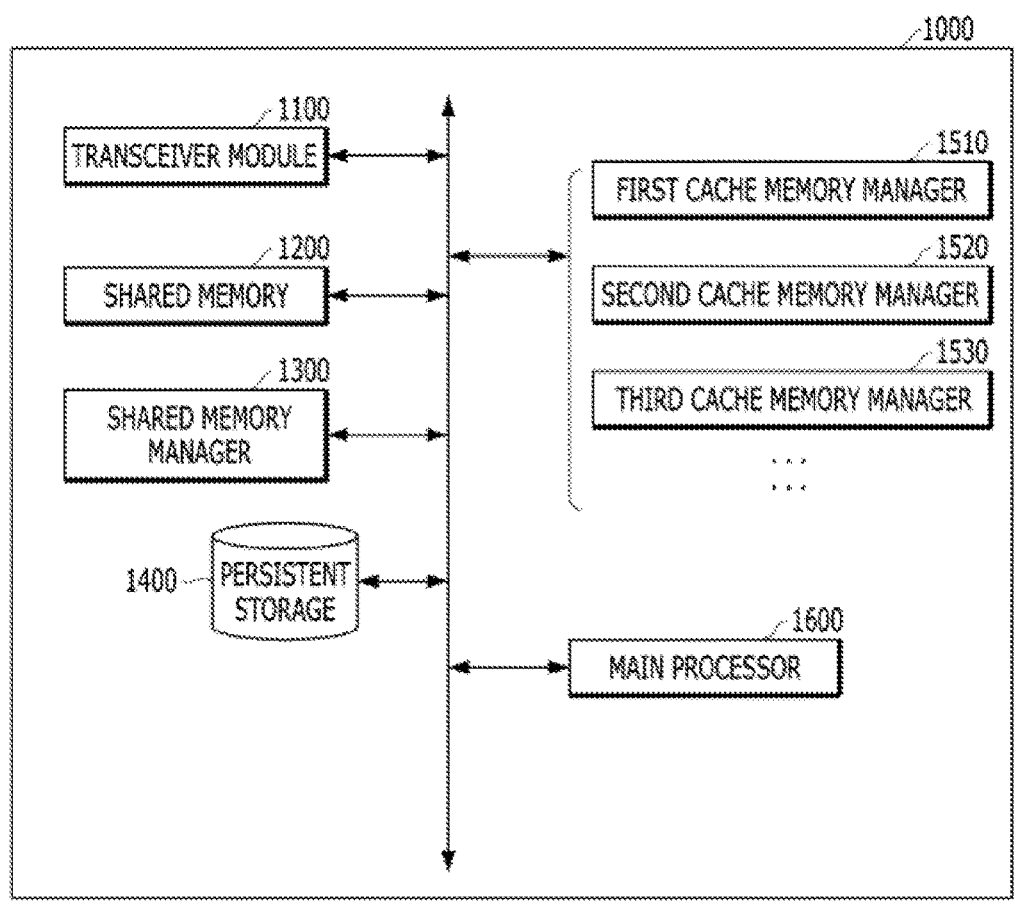
FIG. 2 illustrates components of a database server according to an exemplary embodiment of the present disclosure.

FIG. 2 illustrates components of a database server according to an exemplary embodiment of the present disclosure.

As illustrated in FIG. 2, a database server 1000 includes a transceiver module 1100, a shared memory 1200, a shared memory manager 1300, a persistent storage 1400, a plurality of cache memory managers 1510, 1520, 1530, . . . , and a main processor 1600. Further, the database server 1000 may include various processors which are not illustrated.

The transceiver module 1100 receives data storing and inquiring requests and index building and inquiring requests from the user. Further, the transceiver module 1100 may receive a request for various transactions from the user.

The main processor 1600 performs a database operation. The main processor 1600 may be implemented by one processor or a plurality of processors. When the main processor 1600 performs the database operation, the main processor 1600 may need a cache memory which loads and stores data recorded in the persistent storage 1400.

The database operation refers to an operation which is performed in the database server. For example, the database operation includes addition, change, and deletion of data.

The shared memory 1200 refers to an area of the memory which is accessible by a plurality of processors in the database server 1000. The plurality of processors in the database server 1000 may share data through the shared memory 1200.

The shared memory 1200 may store an object recorded in the persistent storage 1400 to allow the database server 1000 to perform the database operation.

For example, when the operation is performed by the main processor 1600, at least a part of the shared memory 1200 may be provided as a cache memory to store the object stored in the persistent storage 1400.

In this case, since the objects stored in the shared memory 1200 may be reused in the subsequent operation, the object is not deleted from the shared memory 1200 but stored therein. The shared memory manager 1300 divides the shared memory 1200 into a plurality of memory chunks to manage the memory chunks.

The shared memory manager 1300 divides the shared memory 1200 into a plurality of memory chunks in accordance with various criteria.

For example, the shared memory manager 1300 divides the shared memory 1200 into a plurality of chunks based on a predetermined capacity. For example, the shared memory manager 1300 may divide the shared memory 1200 into the plurality of chunks in the unit of 100 megabytes or 1000 megabytes. But, the present disclosure is not limited thereto and the shared memory may be divided by various capacity units. In this case, one memory chunk may be a memory having a predetermined capacity.

The shared memory manager 1300 divides the shared memory 1200 into a plurality of chunks based on a physical unit. For example, when the shared memory 1200 is configured by a plurality of memories which is physically divided, the shared memory manager 1300 divides the shared memory 1200 into a plurality of chunks by defining memories which are physically adjacent to each other as one memory chunk.

In this case, an operation of the above-described shared memory manager 1300 of the database server 1000 may be performed in a background process.

The database server 1000 may include a plurality of cache memory managers 1510.

The cache memory manager 1510 manages a cache memory. For example, when the main processor 1600 performs the database operation, the cache memory manager provides a cache memory which stores data stored in the persistent storage 1400, to the main processor 1600.

At least one memory chunk is allocated to the cache memory manager 1510 by the shared memory manager 1300. Further, the cache memory manager 1510 provides the allocated memory chunks as cache memories.

The cache memory manager 1510 may provide the allocated memory chunks as cache memories which store data having a similar life cycle. For example, a first cache memory manager 1510 may provide the allocated memory chunks as cache memories which store data whose life cycle falls within a predetermined range.

In this case, life cycles of data which are stored in the cache memories managed by a plurality of cache memory managers 1510 may be different from each other.

For example, memory chunks which are allocated to a first cache memory manager 1510 are provided as cache memories which store data whose life cycle is within a predetermined first range, memory chunks which are allocated to a second cache memory manager 1520 are provided as cache memories which store data whose life cycle is within a predetermined second range and the first range and the second range may be different from each other.

According to one exemplary embodiment of the present disclosure, the cache memory manager 1510 may determine a purpose of the allocated memory chunk, in advance. For example, the cache memory manager 1510 may determine a purpose of the allocated memory chunk in advance based on similarity of the life cycle of the data which will be stored in the allocated memory chunk. Further, the cache memory manager 1510 provides the allocated memory chunk as a cache memory having the predetermined purpose.

For example, the cache memory manager 1510 sets a purpose of the allocated memory chunk as a data dictionary (DD) cache memory, a physical plan (PP) cache memory, or a slab cache memory based on the life cycle of the data which is stored in the allocated memory chunk, but is not limited thereto.

The DD cache memory refers to a cache memory in which meta information related with a data table is stored, the PP cache memory refers to a cache memory in which information related with an executing plan of the database operation is stored, and the slab cache memory refers to a cache memory which is used to secure a plurality of memory spaces which is divided in a predetermined unit.

The cache memory manager 1510 may determine that the cache memory is required. For example, when the main processor 1600 requests the cache memory in order to load and store data recorded in the persistent storage 1400, if a size of a memory in which the data is not stored is smaller than that of a cache memory requested by the main processor 1600, among the cache memories managed by the cache memory manager 1510, the cache memory manager 1510 may determine that the cache memory is required.

When a rate of a part of the cache memory, which is managed by the cache memory manager 1510, in which data is not stored is equal to or smaller than a predetermined rate or a size of a part of the cache memory, in which data is not stored is equal to or smaller than a predetermined memorysize, the cache memory manager 1510 determines that the cache memory is required. But it is not limited thereto and the cache memory manager 1510 may determine that the cache memory is required by using various methods.

The cache memory manager 1510 may determine whether to request the memory chunk to the shared memory manager 1300 based on the entire size of the shared memory and at least a part of memory sizes allocated to a plurality of cache memory managers 1510.

For example, the cache memory manager 1510 may compare the entire size of the shared memory and memory sizes allocated to the plurality of cache memory managers 1510. Further, the cache memory manager 1510 may determine whether to request a memory chunk to the shared memory manager 1300 based on a comparison result.

For example, when a rate between the entire size of the shared memory and the sizes of the memories allocated to the plurality of cache memory managers 1510 is equal to or smaller than a specific critical value, the cache memory manager 1510 may determine to request the memory chunk to the shared memory manager 1300.

The cache memory manager 1510 inputs a first value indicating the entire size of the shared memory and a second value indicating memory sizes allocated to the plurality of cache memory managers 1510 to a predetermined function and determines to request the memory chuck in accordance with a deduced result of the function.

According to an exemplary embodiment of the present disclosure, the cache memory manager 1510 may determine an amount of memory chunks which are requested to the shared memory manager 1300 based on the entire size of the shared memory 1200 and at least a part of memory sizes allocated to the plurality of cache memory managers 1510.

For example, the cache memory manager 1510 may determine an amount of memory chunks which are requested to the shared memory manager 1300 based on a rate between the entire size of the shared memory 1200 and the memory sizes allocated to the plurality of cache memory managers 1510.

The cache memory manager 1510 may determine the amount of memory chunks to be requested to the shared memory manager 1300 by comparing a size of a cache memory requested by the main processor 1600 to load the data recorded in the persistent storage 1400 and a size of a part of the cache memory managed by the cache memory manager 1510 in which data is not stored, and the cache memory manager 1510 is not limited thereto but may determine the amount of memory chunks to be requested to the shared memory manager 1300 in accordance with various criteria.

According to another exemplary embodiment of the present disclosure, the cache memory manager 1510 may determine whether to request a memory chunk to the shared memory manager 1300 based on the entire size of the shared memory 1200 and at least a part of memory sizes allocated to the cache memory managers 1510 in order to secure the cache memory.

For example, the cache memory manager 1510 may compare the entire size of the shared memory 1200 and memory sizes allocated to the cache memory manager 1510. Further, the cache memory manager 1510 may determine whether to request a memory chunk to the shared memory manager 1300 based on a comparison result.

For example, the cache memory manager 1510 may determine whether to request the memory chunks to the shared memory manager 1300 in accordance with a rate between the entire size of the shared memory 1200 and the memory sizes allocated to the cache memory managers 1510.

In this case, the cache memory manager 1510 may determine an amount of memory chunks which are requested to the shared memory manager 1300 based on the entire size of the shared memory and at least a part of memory sizes allocated to the cache memory managers 1510.

For example, the cache memory manager 1510 may determine an amount of memory chunks which are requested to the shared memory manager 1300 in accordance with a rate between the entire size of the shared memory 1200 and the memory sizes allocated to the cache memory managers 1510.

According to another exemplary embodiment of the present disclosure, the cache memory manager 1510 may determine whether to delete at least a part of the data stored in a cache memory managed by the cache memory manager based on the entire size of the shared memory 1200 and at least a part of the memory sizes allocated to the plurality of cache memory managers 1510 in order to secure the cache memory.

For example, when a rate between the entire size of the shared memory and the sizes of the memories allocated to the plurality of cache memory managers 1510 is equal to or larger than a specific critical value, the cache memory manager 1510 may determine to delete at least a part of the data stored in the cache memory managed by the cache memory manager.

The cache memory manager 1510 inputs a first value indicating the entire size of the shared memory and a second value indicating memory sizes allocated to the plurality of cache memory managers 1510 to a predetermined function and determines whether to delete at least a part of the data stored in the cache memory managed by the cache memory manager in accordance with a deduced result of the function.

In this case, the cache memory manager 1510 may determine not to delete data which is being used by the processor, among the data stored in the cache memory. For example, the cache memory manager 1510 may determine not to delete data which is represented to be in use by the processor, among the data stored in the cache memory.

In this case, the cache memory manager 1510 may determine whether to delete at least a part of the data stored in the cache memory managed by the cache memory manager before determining whether to request at least one memory chunk to the shared memory manager 1300.

When the cache memory manager 1510 deletes at least a part of the data stored in the cache memory, the cache memory manager 1510 may determine to delete the data stored in the cache memory based on an order used by the processor. For example, the cache memory manager 1510 may determine at least one data to be deleted, among the data stored in the cache memory, based on the order of the data which is used by the processor or may determine a deleting order of the data stored in the cache memory based on the order of the data which is used by the processor. For example, the cache memory manager 1510 may delete data which has been used a long time ago by the processor, first.

The cache memory manager 1510 may determine an amount of data to be deleted from data stored in the cache memory managed by the cache memory manager based on the entire size of the shared memory 1200 and at least a part of memory sizes allocated to a plurality of cache memory managers 1510.

For example, the cache memory manager 1510 may determine an amount of data to be deleted from data stored in the cache memory managed by the cache memory manager in accordance with a rate between the entire size of the shared memory 1200 and the memory sizes allocated to a plurality of cache memory managers 1510.

The cache memory manager 1510 may determine an amount of data to be deleted from the cache memory by comparing a size of a cache memory requested by the main processor 1600 to load the data recorded in the persistent storage 1400 and a size of a part of the cache memory managed by the cache memory manager 1510 in which data is not stored, and the cache memory manager 1510 is not limited thereto but may determine the amount of data to be deleted from the cache memory in accordance with various criteria.

In this case, an operation of the above-described cache memory manager 1510 of the database server 1000 may be performed in a background process. For example, the operation of the cache memory manager 1510 may be periodically performed in the background process.

In this case, the database server 1000 may determine whether to periodically perform the above-described operation of the cache memory manager 1510 based on the rate between the entire size of the shared memory 1200 and the memory size allocated to the plurality of cache memory managers 1510.

For example, when a rate of the memory chunks in the shared memory 1200 which are allocated to the plurality of cache memory managers 1510, 1520, 1530, 1540, . . . , is equal to or larger than a predetermined critical value (for example, 80%), the database server 1000 may perform the above-described operation of the cache memory manager 1510 at every predetermined period (for example, 6 seconds).

According to another exemplary embodiment of the present disclosure, the cache memory manager 1510 may determine whether to delete at least a part of the data from the cache memory based on the entire size of the shared memory and at least a part of the memory sizes allocated to the plurality of cache memory managers 1510 in order to secure the cache memory.

For example, the cache memory manager 1510 may determine whether to delete at least a part of data from the cache memory based on a rate between the entire size of the shared memory 1200 and the memory sizes allocated to the cache memory managers 1510.

In this case, the cache memory manager 1510 may determine an amount of data to be deleted from the cache memory based on the entire size of the shared memory 1200 and at least a part of memory sizes allocated to the cache memory managers 1510.

For example, the cache memory manager 1510 may determine an amount of data to be deleted from the cache memory based on a rate between the entire size of the shared memory 1200 and the memory sizes allocated to the cache memory managers 1510.

Figure 3:
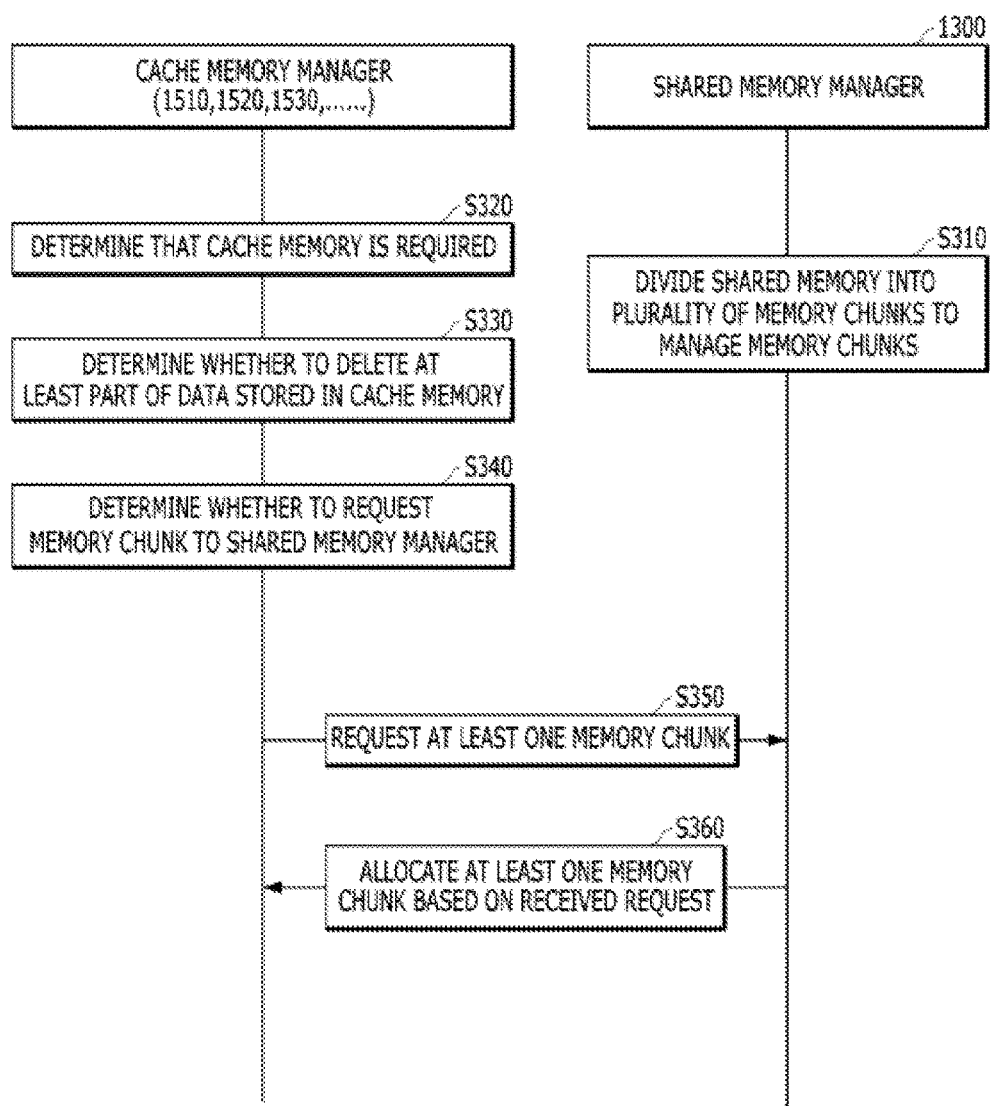
FIG. 3 is a view explaining an operation of a database server according to an exemplary embodiment of the present disclosure.

FIG. 3 is a view explaining an operation of a database server according to an exemplary embodiment of the present disclosure.

In step S310, the shared memory manager 1300 divides the shared memory 1200 into a plurality of memory chunks to manage the memory chunks.

The shared memory manager 1300 divides the shared memory 1200 into a plurality of memory chunks in accordance with various criteria.

For example, the shared memory manager 1300 divides the shared memory 1200 into a plurality of chunks based on a predetermined capacity. For example, the shared memory manager 1300 may divide the shared memory 1200 into the plurality of chunks in the unit of 100 megabytes or 1000 megabytes. But, the present disclosure is not limited thereto and the shared memory may be divided by various capacity units.

The shared memory manager 1300 divides the shared memory 1200 into a plurality of chunks based on a physical unit. For example, when the shared memory 1200 is configured by a plurality of memories which is physically divided, the shared memory manager 1300 divides the shared memory 1200 into a plurality of chunks by defining memories which are physically adjacent to each other as one memory chunk.

In this case, an operation of the above-described shared memory manager 1300 of the database server 1000 may be performed in a background process.

In step S320, the cache memory manager 1510 may determine that the cache memory is required.

For example, when the main processor 1600 requests the cache memory in order to load and store data recorded in the persistent storage 1400, if a size of a memory in which the data is not stored is smaller than that of a cache memory requested by the main processor 1600, among the cache memories managed by the cache memory manager 1510, the cache memory manager 1510 may determine that the cache memory is required.

When a rate of a part of the cache memory, which is managed by the cache memory manager 1510, in which data is not stored is equal to or smaller than a predetermined rate, the cache memory manager 1510 determines that the cache memory is required. But it is not limited thereto and the cache memory manager 1510 may determine that the cache memory is required using various methods.

In step S330, the cache memory manager 1510 may determine to delete at least a part of the data stored in a cache memory managed by the cache memory manager based on the entire size of the shared memory 1200 and at least a part of the memory sizes allocated to the plurality of cache memory managers 1510 in order to secure the cache memory.

For example, when a rate between the entire size of the shared memory and the sizes of the memories allocated to the plurality of cache memory managers 1510 is equal to or larger than a specific critical value, the cache memory manager 1510 may determine to delete at least a part of the data stored in the cache memory managed by the cache memory manager.

The cache memory manager 1510 inputs a first value indicating the entire size of the shared memory and a second value indicating memory sizes allocated to the plurality of cache memory managers 1510 to a predetermined function and determines to delete at least a part of the data stored in the cache memory managed by the cache memory manager in accordance with a deduced result of the function.

In this case, the cache memory manager 1510 may determine not to delete data which is being used by the processor, among the data stored in the cache memory. For example, the cache memory manager 1510 may determine not to delete data which is represented to be in use by the processor, among the data stored in the cache memory.

In this case, the cache memory manager 1510 may determine to delete the data stored in the cache memory based on an order of the data which is used by the processor. For example, the cache memory manager 1510 may determine at least one data to be deleted, among the data stored in the cache memory, based on the order of the data which is used by the processor and may determine a deleting order of the data stored in the cache memory based on the order of the data which is used by the processor. For example, the cache memory manager 1510 may delete data which has been used a long time ago by the processor, first.

The cache memory manager 1510 may determine an amount of data to be deleted from data stored in the cache memory managed by the cache memory manager based on the entire size of the shared memory 1200 and at least a part of the memory sizes allocated to a plurality of cache memory managers 1510.

For example, the cache memory manager 1510 may determine an amount of data to be deleted from data stored in the cache memory managed by the cache memory manager in accordance with a rate between the entire size of the shared memory 1200 and the memory sizes allocated to the plurality of cache memory managers 1510.

The cache memory manager 1510 may determine an amount of data to be deleted from the cache memory by comparing a size of a cache memory requested by the main processor 1600 to load the data recorded in the persistent storage 1400 and a size of a part of the cache memory managed by the cache memory manager 1510 in which data is not stored and the cache memory manager 1510 is not limited thereto but may determine the amount of data to be deleted from the cache memory in accordance with various criteria.

In this case, an operation of the above-described cache memory manager 1510 of the database server 1000 may be performed in a background process. For example, the operation of the cache memory manager 1510 may be periodically performed as a background process.

In this case, the database server 1000 may determine whether to periodically perform the above-described operation of the cache memory manager 1510 based on the rate between the entire size of the shared memory 100 and the memory size allocated to the plurality of cache memory managers 1510.

For example, when a rate of the memory chunks in the shared memory 1200 which are allocated to the plurality of cache memory managers 1510, 1520, 1530, 1540, . . . , is equal to or larger than a predetermined critical value (for example, 80%), the database server 1000 may perform the above-described operation of the cache memory manager 1510 at every predetermined period (for example, 6 seconds).

According to another exemplary embodiment of the present disclosure, the cache memory manager 1510 may determine whether to delete at least a part of data from the cache memory based on the entire size of the shared memory 1200 and at least a part of the memory sizes allocated to the cache memory managers 1510 in order to secure the cache memory.

For example, the cache memory manager 1510 may determine whether to delete at least a part of the data from the cache memory based on a rate between the entire size of the shared memory 1200 and the memory sizes allocated to the cache memory managers 1510.

In this case, the cache memory manager 1510 may determine an amount of data to be deleted from the cache memory based on the entire size of the shared memory 1200 and at least a part of the memory sizes allocated to the cache memory managers 1510.

For example, the cache memory manager 1510 may determine an amount of data to be deleted from the cache memory based on a rate between the entire size of the shared memory 1200 and the memory sizes allocated to the cache memory managers 1510.

In step S340, the cache memory manager 1510 may determine whether to request the memory chunk to the shared memory manager 1300 based on the entire size of the shared memory and at least a part of the memory sizes allocated to the plurality of cache memory managers 1510.

For example, the cache memory manager 1510 may compare the entire size of the shared memory and the memory sizes allocated to the plurality of the cache memory managers 1510. Further, the cache memory manager 1510 may determine whether to request a memory chunk to the shared memory manager 1300 based on a comparison result.

For example, when a rate between the entire size of the shared memory and the sizes of the memories allocated to the plurality of cache memory managers 1510 is equal to or smaller than to a specific critical value, the cache memory manager 1510 may determine to request the memory chunk to the shared memory manager 1300.

The cache memory manager 1510 inputs a first value indicating the entire size of the shared memory and a second value indicating memory sizes allocated to the plurality of cache memory managers 1510 to a predetermined function and determines to request the memory chuck in accordance with a deduced result of the function.

The cache memory manager 1510 may determine an amount of memory chunks which are requested to the shared memory manager 1300 based on the entire size of the shared memory 1200 and at least a part of the memory sizes allocated to the plurality of cache memory managers 1510.

For example, the cache memory manager 1510 may determine an amount of memory chunks which are requested to the shared memory manager 1300 based on a rate between the entire size of the shared memory 1200 and the memory sizes allocated to the plurality of cache memory managers 1510.

The cache memory manager 1510 may determine the amount of memory chunks to be requested to the shared memory manager 1300 by comparing a size of a cache memory requested by the main processor 1600 to load the data recorded in the persistent storage 1400 and a size of a part of the cache memory managed by the cache memory manager 1510 in which data is not stored. The cache memory manager 1510 is not limited thereto but may determine the amount of memory chunks to be requested to the shared memory manager 1300 in accordance with various criteria.

According to another exemplary embodiment of the present disclosure, the cache memory manager 1510 may determine whether to request a memory chunk to the shared memory manager 1300 based on the entire size of the shared memory and at least a part of the memory sizes allocated to the cache memory managers 1510 in order to secure the cache memory.

For example, the cache memory manager 1510 may compare the entire size of the shared memory 1200 and the memory sizes allocated to the cache memory managers 1510. Further, the cache memory manager 1510 may determine whether to request a memory chunk to the shared memory manager 1300 based on a result of comparison.

For example, the cache memory manager 1510 may determine whether to request the memory chunks to the shared memory manager 1300 in accordance with a rate between the entire size of the shared memory 1200 and the memory sizes allocated to the cache memory managers 1510. In this case, the cache memory manager 1510 may determine an amount of memory chunks which are requested to the shared memory manager 1300 based on the entire size of the shared memory and at least a part of the memory sizes allocated to the cache memory managers 1510.

For example, the cache memory manager 1510 may determine an amount of memory chunks which are requested to the shared memory manager 1300 in accordance with a rate between the entire size of the shared memory 1200 and the memory sizes allocated to the plurality of cache memory managers 1510.

In step S350, the cache memory manager 1510 may request at least one memory chunk to the shared memory manager 1300.

For example, the cache memory manager 1510 may request memory chunks having an amount which is determined based on a ratio between the entire size of the shared memory 1200 and the memory sizes allocated to the plurality of cache memory managers 1510 to the shared memory manager 1300.

In step S360, the shared memory manager 1300 may allocate at least a memory chunk to the cache memory manager 1510 based on a request of the cache memory manager 1510.

The cache memory manager 1510 may provide at least one allocated memory chunk to the main processor 1600 as a cache memory.

The database server 1000 includes a plurality of cache memory managers 1510 and the plurality of memory managers may provide the allocated memory chunks as cache memories which store data having a similar life cycle. For example, a first cache memory manager 1510 may provide the allocated memory chunks as cache memories which store data whose life cycle is within a predetermined range.

In this case, life cycles of data which are stored in the cache memories managed by a plurality of cache memory managers 1510 may be different from each other.

For example, memory chunks which are allocated to the first cache memory manager 1510 are provided as cache memories which store data whose life cycle is within a predetermined first range, memory chunks which are allocated to a second cache memory manager 1520 are provided as cache memories which store data whose life cycle is within a predetermined second range and the first range and the second range may be different from each other.

The cache memory manager 1510 may determine a purpose of the allocated memory chunk. For example, the cache memory manager 1510 may determine a purpose of the allocated memory chunk in advance based on similarity of the life cycle of the data which will be stored in the allocated memory chunk. Further, the cache memory manager 1510 provides the allocated memory chunk as a cache memory having the predetermined purpose.

For example, the cache memory manager 1510 sets a purpose of the allocated memory chunk as a data dictionary (DD) cache memory, a physical plan (PP) cache memory, or a slab cache memory based on the life cycle of the data which is stored in the allocated memory chunk, but is not limited thereto.

FIG. 4 is a view illustrating a method for allocating a shared memory 1200 according to an exemplary embodiment of the present disclosure.

Referring to FIG. 4, the shared memory 1200 may be divided into a plurality of chunks. The shared memory manager 1300 divides the shared memory 1200 into a plurality of memory chunks in accordance with various criteria to manage the memory chunks.

The database server 1000 may include a plurality of cache memory managers 1510.

The cache memory manager 1510 manages a cache memory. For example, when the main processor 1600 performs the database operation, the cache memory manager provides a cache memory which stores data stored in the persistent storage 1400, to the main processor 1600.

The cache memory manager 1510 may provide the allocated memory chunks as cache memories which store data having a similar life cycle. For example, a first cache memory manager 1510 may provide the allocated memory chunks as cache memories which store data whose life cycle is within a predetermined range.

The cache memory manager 1510 provides the allocated memory chunk as a cache memory having the predetermined purpose.

For example, the cache memory manager 1510 sets a purpose of the allocated memory chunk as a data dictionary (DD) cache memory, a physical plan (PP) cache memory, or a slab cache memory based on the life cycle of the data which is stored in the allocated memory chunk, but is not limited thereto.

Referring to FIG. 4, the database server 1000 may include a plurality of cache memory managers and different types of data may be stored in each cache memory managed by the plurality of cache memory managers 1510, 1520, 1530, 1540, . . . .

The cache memory manager 1510 may determine whether to request the memory chunks to the shared memory manager 1300 based on the entire size of the shared memory 1200 and at least a part of the memory sizes allocated to the plurality of cache memory managers 1510.

For example, referring to FIG. 4, the cache memory manager 1510 determines whether to request the memory chunk to the shared memory manager 1300 based on a rate (for example, a currently allocated memory of the entire shared memory is approximately 58%) between the entire size (for example, 12 memory chunks) of the shared memory 1200 and a memory size (for example, seven memory chunks) allocated to the plurality of cache memory managers.

The cache memory manager 1510 may determine an amount of memory chunks which are requested to the shared memory manager 1300 based on the entire size of the shared memory 1200 and at least a part of the memory sizes allocated to the plurality of cache memory managers 1510.

For example, referring to FIG. 4, the cache memory manager 1510 determines an amount of memory chunks which are requested to the shared memory manager 1300 based on a rate (for example, a currently allocated memory of the entire shared memory is approximately 58%) between the entire size (for example, 12 memory chunks) of the shared memory 1200 and a memory size (for example, seven memory chunks) allocated to the plurality of cache memory managers.

According to another exemplary embodiment of the present disclosure, the cache memory manager 1510 may determine whether to request a memory chunk to the shared memory manager 1300 based on the entire size of the shared memory 1200 and at least a part of the memory sizes allocated to the cache memory managers 1510 in order to secure the cache memory.

For example, referring to FIG. 4, a first cache memory manager 1510 may compare the entire size (for example, 12 memory chunks) of the shared memory 1200 and the memory size (for example, one) which is allocated to the first cache memory manager 1510. Further, the first cache memory manager 1510 may determine whether to request the memory chunk to the shared memory manager 1300 in accordance with a rate (for example, a memory, of the entire shared memory, which is allocated to the first cache memory manager is approximately 8%) between the entire size (for example, 12 memory chunks) of the shared memory 1200 and a memory size (for example, one) allocated to the cache memory managers 1510.

In this case, the cache memory manager 1510 may determine an amount of memory chunks which are requested to the shared memory manager 1300 based on the entire size of the shared memory and at least a part of the memory sizes allocated to the cache memory managers 1510.

For example, referring to FIG. 4, a first cache memory manager 1510 may compare the entire size (for example, 12 memory chunks) of the shared memory 1200 and the memory size (for example, one) which is allocated to the first cache memory manager 1510. Further, the first cache memory manager 1510 may determine an amount of memory chunks which are requested to the shared memory manager 1300 in accordance with a ratio (for example, a memory, of the entire shared memory, which is allocated to the first cache memory manager is approximately 8%) between the entire size (for example, 12 memory chunks) of the shared memory 1200 and a memory size (for example, one) allocated to the cache memory managers 1510.

In this case, the cache memory manager 1510 may determine whether to delete data included in the cache memory based on the entire size of the shared memory 1200 and at least a part of the memory sizes allocated to the plurality of cache memory managers 1510.

For example, referring to FIG. 4, the cache memory manager 1510 determines whether to delete data included in the cache memory based on a rate (for example, a currently allocated memory of the entire shared memory is approximately 58%) between the entire size (for example, 12 memory chunks) of the shared memory 1200 and a memory size (for example, seven memory chunks) allocated to the plurality of cache memory managers.

The cache memory manager 1510 may determine an amount of data to be deleted, based on the entire size of the shared memory 1200 and at least a part of the memory sizes allocated to the plurality of cache memory managers 1510.

For example, referring to FIG. 4, the cache memory manager 1510 determines whether to delete data included in the cache memory based on a ratio (for example, a currently allocated memory of the entire shared memory is approximately 58%) between the entire size (for example, 12 memory chunks) of the shared memory 1200 and a memory size (for example, seven memory chunks) allocated to the plurality of cache memory managers.

According to another exemplary embodiment of the present disclosure, the cache memory manager 1510 may determine whether to delete data included in the cache memory, based on the entire size of the shared memory and at least a part of the memory sizes allocated to the cache memory managers 1510 in order to secure the cache memory.

For example, referring to FIG. 4, a first cache memory manager 1510 may compare the entire size (for example, 12 memory chunks) of the shared memory 1200 and the memory size (for example, one) which is allocated to the first cache memory manager 1510. Further, the first cache memory manager 1510 may determine whether to delete data included in the cache memory based on a ratio (for example, a memory, of the entire shared memory, which is allocated to the first cache memory manager is approximately 8%) between the entire size (for example, 12 memory chunks) of the shared memory 1200 and a memory size (for example, one) allocated to the cache memory managers 1510.

In this case, the cache memory manager 1510 may determine an amount of data to be deleted, based on the entire size of the shared memory and at least a part of the memory sizes allocated to the cache memory managers 1510.

For example, referring to FIG. 4, a first cache memory manager 1510 may compare the entire size (for example, 12 memory chunks) of the shared memory 1200 and the memory size (for example, one) which is allocated to the first cache memory manager 1510. Further, the first cache memory manager 1510 may determine an amount of data to be deleted, based on a ratio (for example, a memory, of the entire shared memory, which is allocated to the first cache memory manager is approximately 8%) between the entire size (for example, 12 memory chunks) of the shared memory 1200 and a memory size (for example, one) allocated to the cache memory managers 1510.

The database server 1000 compares the size of the shared memory 1200 and the size of the memories allocated to the plurality of cache memory managers 1510, 1520, 1530, 1540, . . . , to determine whether to further use the shared memory as a cache memory, thereby efficiently managing the shared memory.

An exemplary embodiment of the present disclosure may be implemented as a recording medium including a command which is executed by a computer such as a program module which is executed by the computer. The computer readable medium may be an arbitrary available medium which is accessed by a computer and includes any of a volatile and non-volatile medium, and a removable and non-removable medium. Further, the computer readable medium may include any of a computer storage medium and a communication medium. The computer storage medium includes a volatile and non-volatile medium, and a removable and non-removable medium which are implemented by an arbitrary method or technique for storing information such as a computer readable command, a data structure, a program module, and other data. The communication medium includes a typical computer readable command, a data structure, a program module, or other data of a modified data signal such as a carrier wave or other transmitting mechanism and also includes an arbitrary information transfer medium. In this case, the computer readable recording medium may be a non-transitory recording medium.

The above-description of the present disclosure is illustrative only and it is understood by those skilled in the art that the present disclosure may be easily modified to other specific type without changing the technical spirit or an essential feature of the present disclosure. Thus, it is to be appreciated that the embodiments described above are intended to be illustrative in every sense, and not restrictive. For example, each component which is described as a singular form may be divided to be implemented and similarly, components which are described as a divided form may be combined to be implemented.

The scope of the present disclosure is represented by the claims to be described below rather than the detailed description, and it is to be interpreted that the meaning and scope of the claims and all the changes or modified forms derived from the equivalents thereof come within the scope of the present disclosure.

What is claimed is:

1. A database server, comprising:
   a plurality of cache memory managers;
   a shared memory manager which divides a shared memory into a plurality of memory chunks to manage the shared memory and allocates at least one memory chunk to each of the plurality of cache memory managers based on a request of each of the plurality of cache memory managers;
     wherein each of the plurality of cache memory managers requests at least one of the plurality of memory chunks to the shared memory manager,
     wherein the database server uses at least one of the memory chunks which are allocated to each of the plurality of cache memory managers as a cache memory having a predetermined purpose, and the predetermined purpose of each of the plurality of cache memory managers are different from each other, and
     wherein each of the plurality of cache memory managers determines to delete at least a part of the data stored in a cache memory managed by each of the plurality of cache memory managers based on a size of the shared memory and a memory size allocated to the plurality of cache memory managers, before determining whether to request at least one memory chunk to the shared memory manager; and
   a main processor which performs a database operation using a cache memory.

2. The database server of claim 1, wherein each of the plurality of cache memory managers determines that the cache memory is required and determines whether to request the memory chunk to the shared memory manager based on an entire size of the shared memory and at least a part of the memory sizes allocated to the plurality of cache memory managers in order to secure the cache memory.

3. The database server of claim 2, wherein when a rate between the entire size of the shared memory and the memory size allocated to the plurality of cache memory managers is equal to or smaller than a specific critical value, each of the plurality of cache memory managers determines to request the memory chunk to the shared memory manager.

4. The database server of claim 2, wherein each of the plurality of cache memory managers compares the entire size of the shared memory and the size of the memory allocated to each of the plurality of cache memory managers.

5. The database server of claim 2, wherein a operation of each of the plurality of cache memory managers is performed by a background processor and periodically determines whether to request the memory chunk.

6. The database server of claim 1, wherein each of the plurality of cache memory managers determines that the cache memory is required and determines to delete at least a part of the data stored in the cache memory managed by each of the plurality of cache memory managers based on the entire size of the shared memory and at least a part of the memory sizes allocated to the plurality of cache memory managers to secure the cache memory.

7. The database server of claim 6, wherein when the rate between the entire size of the shared memory and the memory sizes allocated to the plurality of cache memory managers is equal to or larger than a specific critical value, the each of the plurality of cache memory managers determines to delete at least a part of the data stored in a cache memory managed by each of the plurality of cache memory managers.

8. The database server of claim 6, wherein each of the plurality of cache memory managers determines not to delete data which is currently being used by the main processor of the data stored in the cache memory.

9. The database server of claim 6, wherein the database server determines to delete at least a part of the data stored in the cache memory based on an order of data used by the main processor.

10. The database server of claim 1, wherein each of the predetermined purpose of each of the plurality of cache memory managers is determined based on a life cycle of data to be stored in the cache memory managed by each of the plurality of cache memory managers.

11. The database server of claim 1, wherein each of the plurality of cache memory managers determines an amount of the memory chunk to be requested to the shared memory manager based on the entire size of the shared memory and a memory size allocated to the plurality of cache memory managers.

12. The database server of claim 1, wherein each of the plurality of cache memory managers determines to delete at least a part of the data stored in a cache memory managed by each of the plurality of cache memory managers based on a size of the shared memory and a memory size allocated to each of the plurality of cache memory managers, before determining whether to request at least one memory chunk to the shared memory manager.

13. A database management program which is stored in a non-transitory computer-readable medium and includes commands which allow a computer to perform operations comprising:

an operation of controlling a shared memory manager which divides a shared memory into a plurality of memory chunks to manage the shared memory and allocates at least one memory chunk to each of a plurality of cache memory managers based on a request of each of the plurality of cache memory managers;

an operation of controlling each of the plurality of cache memory managers which requests at least one of the plurality of memory chunks to the shared memory manager, wherein the database server uses at least one of the memory chunks which are allocated to each of the plurality of cache memory managers as a cache memory having a predetermined purpose, and the predetermined purposes of the plurality of cache memory managers are different from each other, and wherein each of the plurality of cache memory managers determines to delete at least a part of the data stored in a cache memory managed by each of the plurality of cache memory managers based on a size of the shared memory and a memory size allocated to the plurality of cache memory managers, before determining whether to request at least one memory chunk to the shared memory manager; and an operation of controlling a main processor which performs a database operation using the cache memory.

14. The database management program of claim 13, wherein the database management program determines that the cache memory is required and controls the cache memory manager to determine whether to request a memory chunk to the shared memory manager based on an entire size of the shared memory and memory size allocated to the plurality of cache memory managers.

\* \* \* \* \*